United States Patent
Husson

(10) Patent No.: US 6,439,799 B1
(45) Date of Patent: Aug. 27, 2002

(54) ASSEMBLY COLLAR, IN PARTICULAR FOR STREET FIXTURES

(75) Inventor: Daniel Husson, Kaysersberg (FR)

(73) Assignee: Societe Financiere du Val d'Orbey, Lapoutroie (FR)

( * ) Notice: Subject to any disclaimer, the term of this patent is extended or adjusted under 35 U.S.C. 154(b) by 0 days.

(21) Appl. No.: 09/627,127

(22) Filed: Jul. 27, 2000

(30) Foreign Application Priority Data

Jul. 27, 1999 (EP) .............................................. 99440212

(51) Int. Cl.[7] .................................................. F16S 7/04
(52) U.S. Cl. ........................ 403/344; 403/396; 256/65; 24/569
(58) Field of Search ................................ 403/340, 385, 403/389, 391, 398, 344, 396; 24/569, 275; 256/68, 65, 26, 69; 248/219.3, 230.1

(56) References Cited

U.S. PATENT DOCUMENTS

| | | | | |
|---|---|---|---|---|
| 1,180,069 A | * | 4/1916 | Osgood | 403/391 X |
| 1,764,584 A | | 6/1930 | Tarrier | |
| 2,052,600 A | * | 9/1936 | Boss | 403/391 X |
| 2,452,406 A | * | 10/1948 | Volkery et al. | 403/391 |
| 3,820,909 A | * | 6/1974 | Schindler et al. | 403/205 |
| 4,479,661 A | * | 10/1984 | Weigl | 403/389 X |
| 5,452,880 A | * | 9/1995 | Bailey | 256/67 |
| 5,769,556 A | * | 6/1998 | Colley | 403/391 X |
| 5,961,242 A | * | 10/1999 | Leone | 256/68 X |

FOREIGN PATENT DOCUMENTS

| | | |
|---|---|---|
| EP | 0 038 229 | 10/1981 |
| EP | 0 321 355 | 6/1989 |
| FR | 974.301 | 2/1951 |
| FR | 1.601.873 | 9/1970 |

* cited by examiner

*Primary Examiner*—Lynne H. Browne
*Assistant Examiner*—John R. Cottingham
(74) *Attorney, Agent, or Firm*—Young & Thompson

(57) ABSTRACT

An assembly collar, in particular for street fixtures, having a portion (1) for mounting on a support post, provided with a hole (2) of a diameter corresponding to that of the post and provided with a cutout (3) in a median longitudinal plane perpendicular to the axis of the hole (2) and permitting its interfitting into a corresponding cutout of a corresponding collar. The collar has a tubular recess (4) with an axis parallel to that of its hole (2) for securement on the support post, the collar being in two independent half portions interconnected in service position by means of at least one screw or a gripping bolt (5). The invention is applicable in the field of assemblies of tubular structures, particularly urban fixtures, and in particular devices useful as fixed barriers or the like.

3 Claims, 4 Drawing Sheets

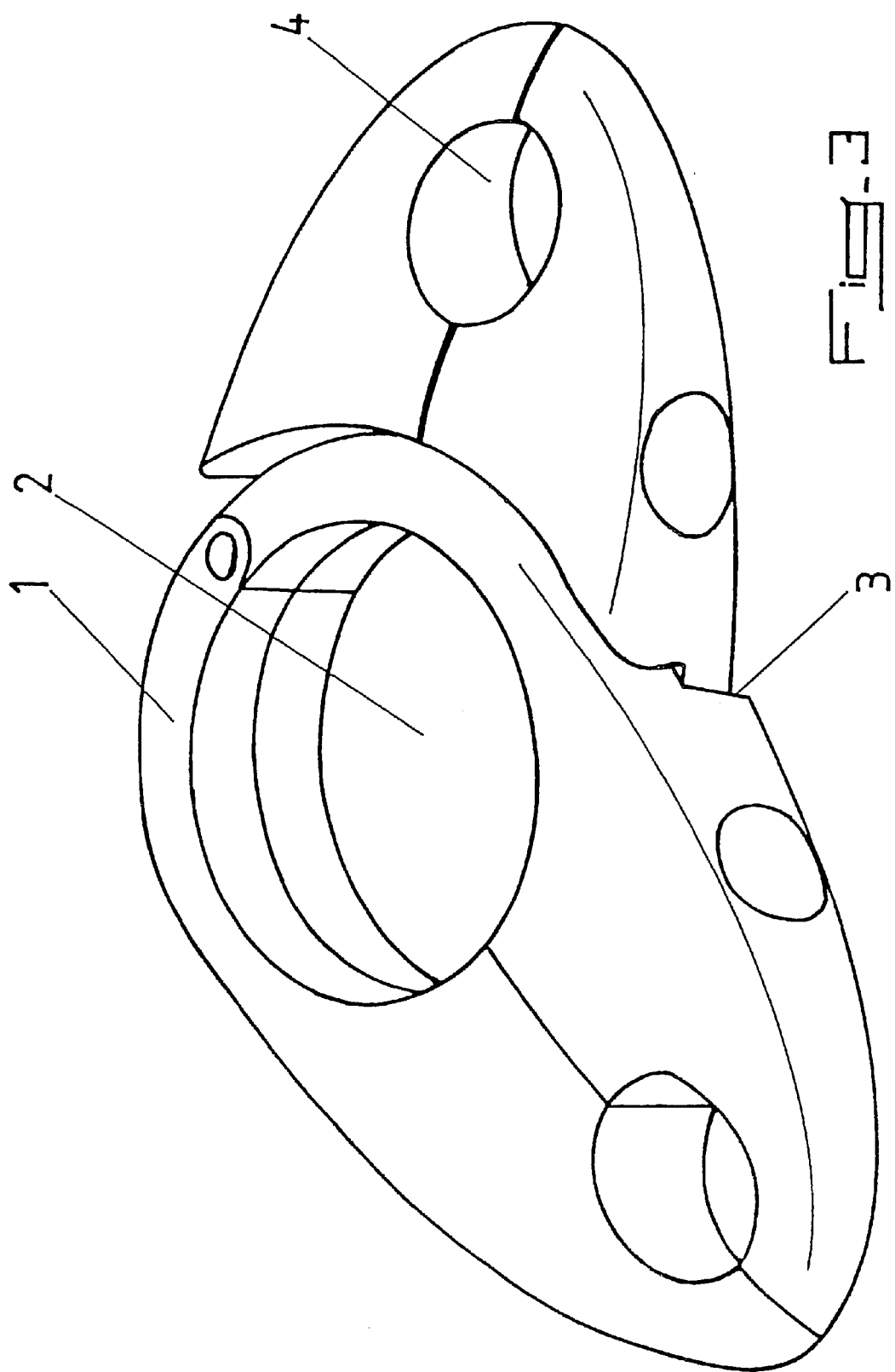

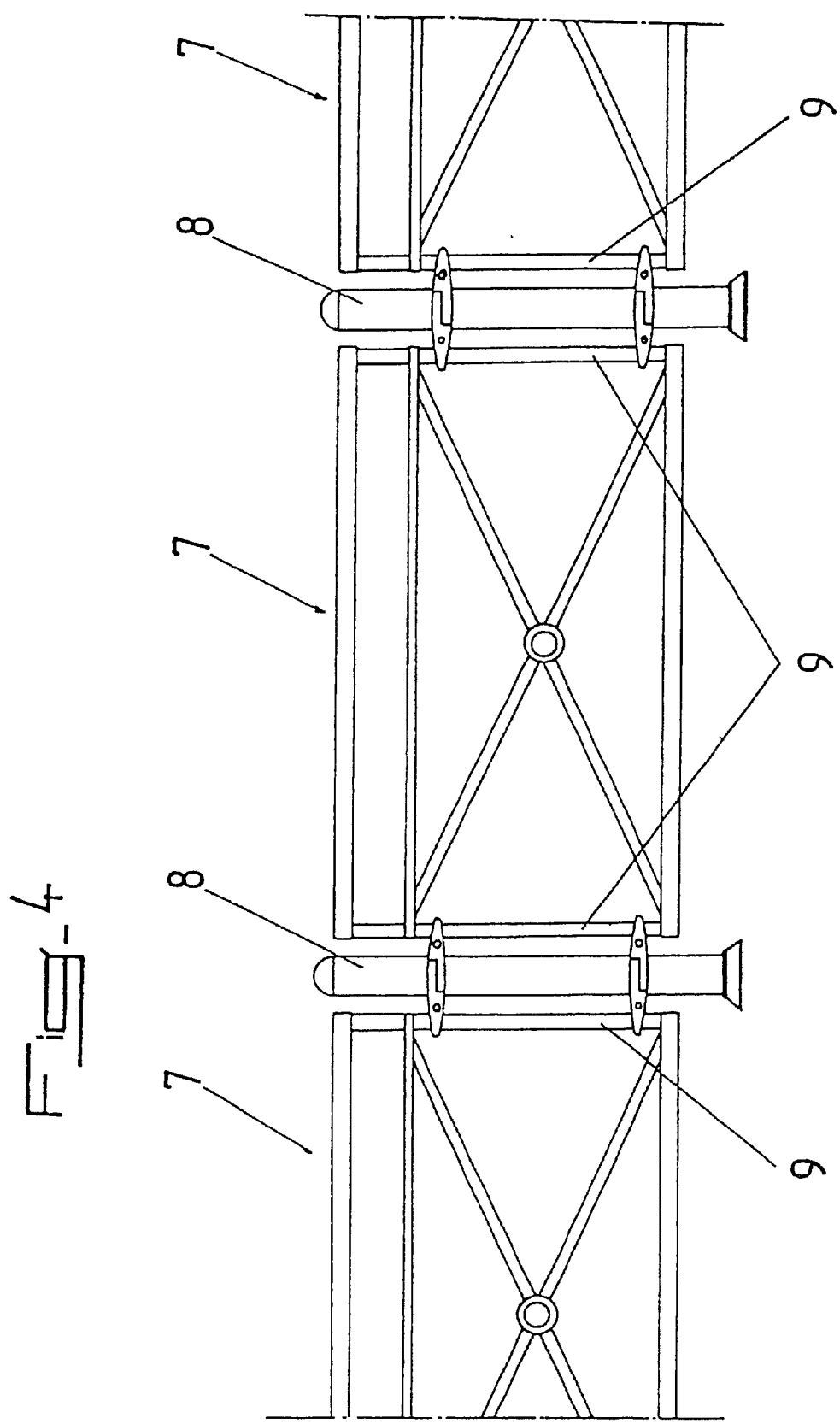

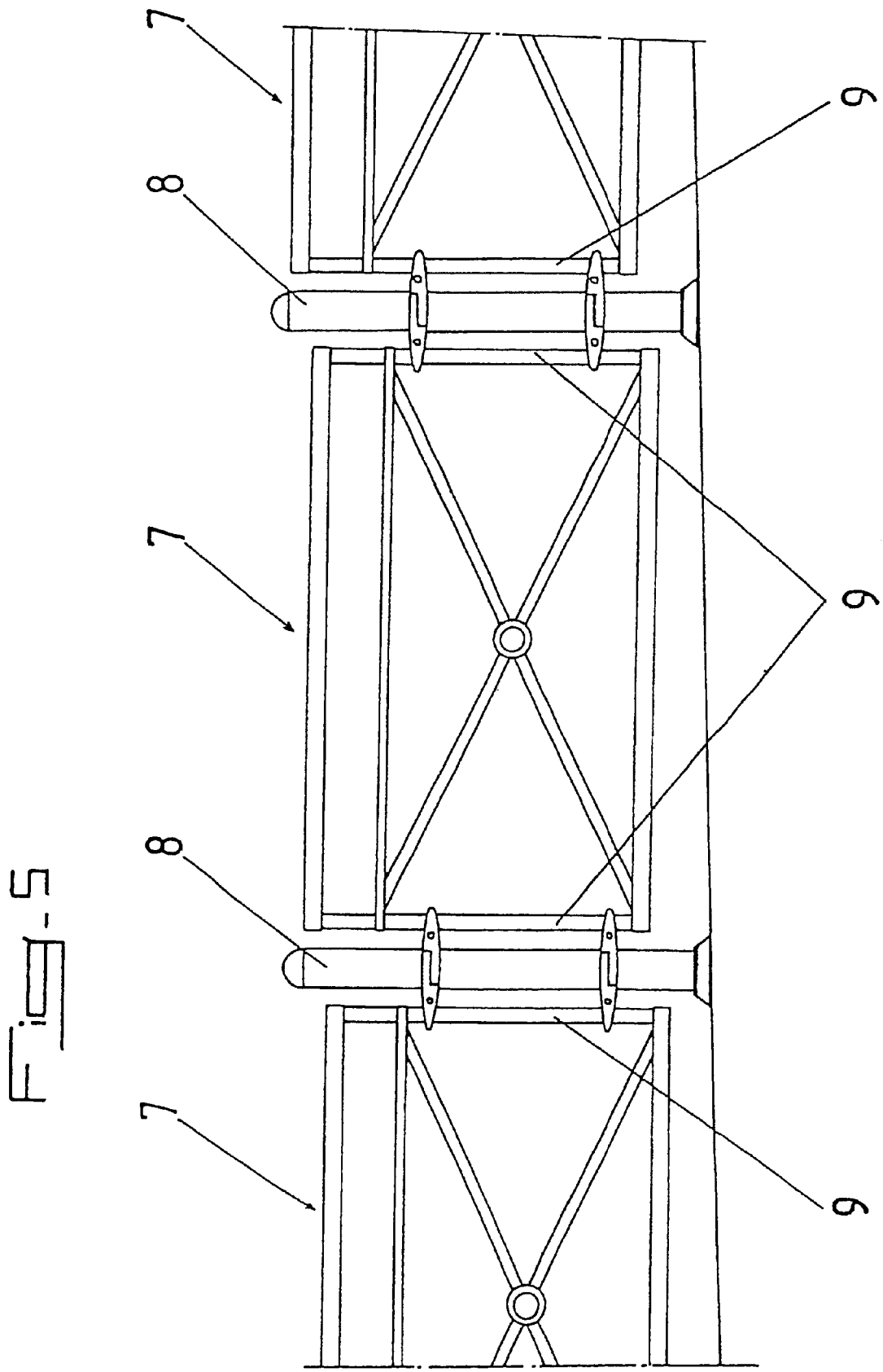

ASSEMBLY COLLAR, IN PARTICULAR FOR STREET FIXTURES

BACKGROUND OF THE INVENTION

The present invention relates to the field of assemblies of tubular structures, in particular street fixtures, and particularly devices usable as fixed barriers or the like, and has for its object an assembly collar, in particular for street fixtures.

At present, barriers are made by using panels of tubular structures mounted on posts disposed at regular intervals by means of collars of the type grip clamped on the posts and coacting with barrier panels by means of tubular stubs or other devices coacting with a corresponding end of the collars. The securement of the stubs in said end of the collars is carried out by insertion of these latter along the longitudinal axis of the mounting collars, which is to say perpendicular to the axis of the support posts. Such a use of collars generally requires, for the installation of a barrier of great length, using several individual panels, and for each panel four collars, such that on each intermediate post it is necessary to mount four collars to carry out the securement of the two adjacent panels.

Such a collar mounting however has an unsatisfactory aesthetic effect, as these collars are relatively cumbersome. Moreover, the provision of a collar for each securement stub gives rise to a diamond pattern of these collars and requires corresponding mounting of the stubs on the barriers.

To avoid the mentioned aesthetic drawback, it has been proposed to provide collars that are reversible relative to the vertical axis of the support post and have on a portion of their body a cutout in the longitudinal median plane permitting the interfitting of two successive collars within each other height-wise. There results a reduction of the overall size of the collars and an improved aesthetic effect.

However, in the case of mounting of barrier panels along a slope, which is to say with a height offset from one barrier to the next, these collars must also be offset height-wise, because of the intermediate mounting means between the barrier and the collar, which is to say the stub or other securement device. It follows that the mentioned drawbacks concerning offset mountings remain.

SUMMARY OF THE INVENTION

The present invention has for its object to overcome these drawbacks, by providing an assembly collar, in particular for street fixtures, permitting providing an aesthetic mounting no matter what the slope of the terrain, whilst using a number of collars that is reduced to the minimum.

To this end, the assembly collar, in particular for street fixtures, which has a mounting portion on a support post, provided with a hole of a diameter corresponding to that of said post and provided with a cutout in the median longitudinal plane perpendicular to the axis of the hole and permitting its interfitting into a corresponding cutout of a corresponding collar, is characterized in that it is provided with a tubular recess with an axis parallel to that of its securement hole on the support post, said collar being in two independent half portions interconnected in the surface position by means of at least one screw or a locking bolt.

BRIEF DESCRIPTION OF THE DRAWINGS

The invention will be better understood, thanks to the following description, which relates to a preferred embodiment, given by way of non-limiting example, and explained with reference to the accompanying schematic drawings, in which:

FIG. 3 is a perspective view showing the mounting of two collars with an angular offset between them;

FIG. 4 is an elevational view showing a portion of a barrier using collars according to the invention, according to an arrangement on a flat terrain, and FIG. 5 is a view similar to that of FIG. 4 showing mounting of a barrier in a sloping arrangement.

DETAILED DESCRIPTION OF THE PREFERRED EMBODIMENTS

Figure 1:
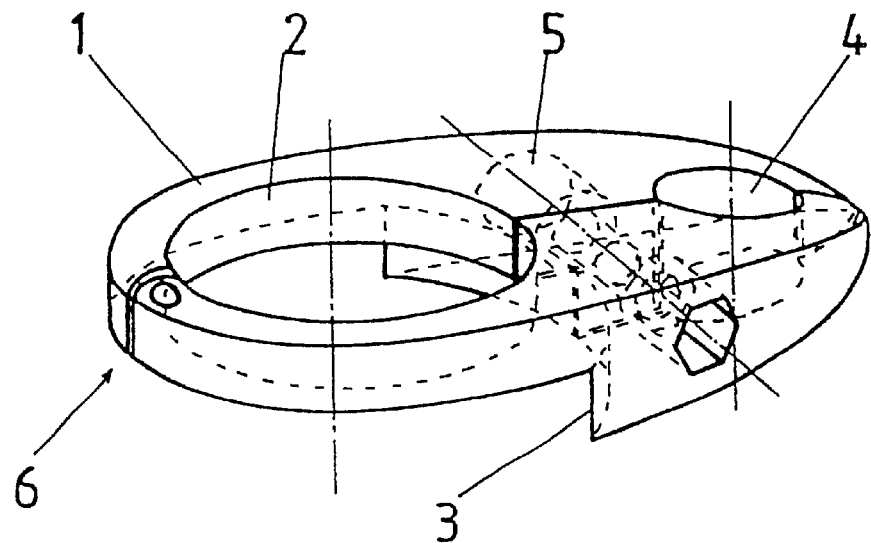
FIG. 1 is a perspective view of a collar according to the invention.
Figure 2:
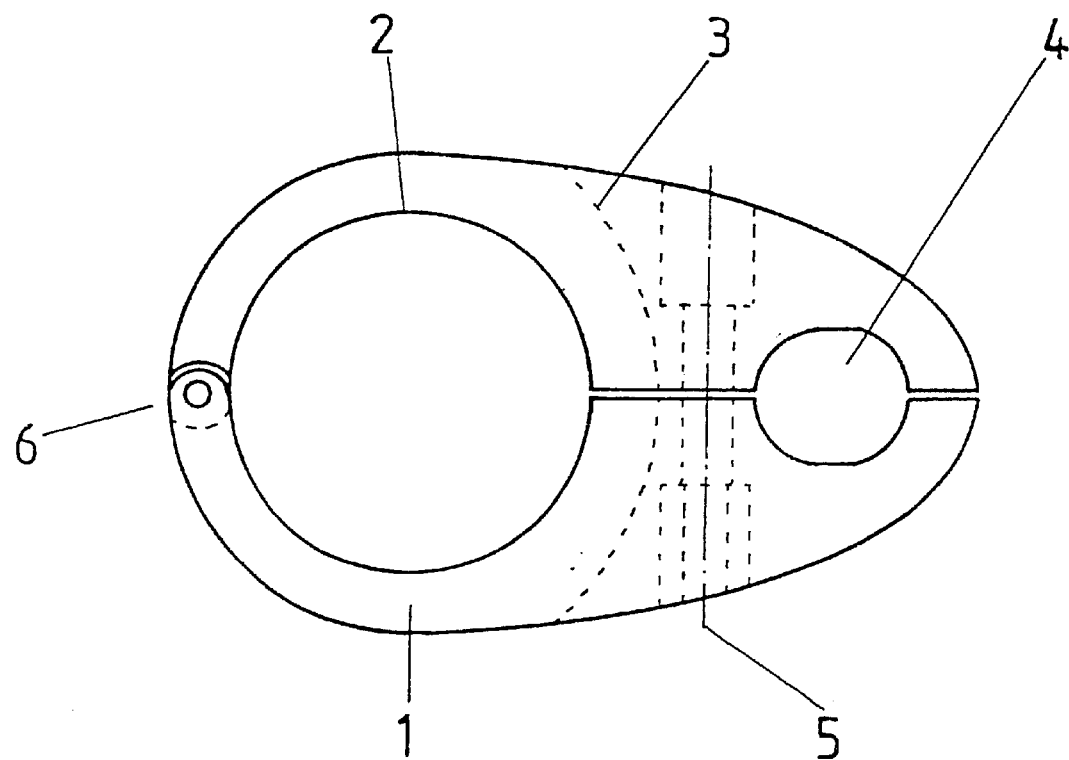
FIG. 2 is a view from above of the collar shown in FIG. 1.

FIGS. 1 and 2 of the accompanying drawings show an assembly collar, in particular for street fixtures, having a mounting portion 1 on a support post, provided with a hole 2 of a diameter corresponding to that of said post and provided with a cutout 3 in a median longitudinal plane perpendicular to the axis of the hole 2 and permitting its interfitting in a corresponding cutout 3 of a corresponding collar.

According to the invention, this collar is provided with a tubular recess 4 with an axis parallel to that of its hole 2 for securement on the support post, said collar being in two independent half portions interconnected in the surface position by means of at least one screw or a locking bolt 5 (shown by its axial line). The independent portions forming each collar are perfectly symmetrical relative to a vertical plane passing through the parallel axes of the hole 2 and the recess 4, only the recesses of the screw head, of the nut or the screw-threaded hole being of course different from one symmetrical portion to the other.

In the embodiment shown in the accompanying drawings, there is provided an assembly of the two half portions forming the collar, by a single screw or a single bolt. However, it can be envisaged to carry out this assembly by means of two screws or bolts, so as to provide for example a more secure gripping, on the one hand, of the collar on the support post and, on the other hand, of the tubular portion of the element to be fixed on said post.

According to one characteristic of the invention, the two half portions constituting the collar are preferably interconnected by means of a hinge 6 at the level of the portion 1 for securement on the support post, preferably in the vertical longitudinal plane of the collar, which is to say the plane passing through the parallel axes of the hole 2 and the recess 4. It is also possible to make the two half portions constituting the collar as independent elements applied against each other in the service position by a flat surface.

The provision of a recess 4 extending parallel to the hole 2 for securement on the support post permits, as shown more particularly in FIGS. 4 and 5, a direct mounting of the tubular upright 9 of a barrier 7 on the collar according to the invention and, because of this, an adjustment in height of said barrier 7 relative to the corresponding support post 8, by simple sliding of the upright 9 in the recess 4, without moving the collar. There results, as shown more particularly in FIG. 5 of the accompanying drawings, a possibility for height-wise movement of one barrier 7 relative to the other, which is particularly interesting and necessary in the case of installation along a slope.

Moreover, the provision of the cutout 3 in the median longitudinal plane perpendicular to the axis of the hole 1 for securement on a support post 8, permits mutual rotation of two collars extending in a same horizontal plane, such that it is possible to carry out simultaneously an angular adaptation of the mounting of two successive barriers 7 (FIG. 3).

According to another characteristic of the invention, not shown in the accompanying drawings, the collar can be provided moreover in its end carrying the recess 4, with a hole extending perpendicular to said recess 4, and permitting mounting at the end of a stub or other securement device for a tubular element, said hole being adapted if desired to be traversed perpendicularly by a screw or a bolt for gripping the collar. Such an end hole can if desired be provided for the securement of an accessory complementary to a barrier. Such a securement can particularly be envisaged in the case of provision of more complicated structures, namely of sets or the like.

According to another characteristic of the invention, not shown in the accompanying drawings, it is also possible to provide on one or the other or on both half portions of the collar, one or several complementary holes with axes parallel to that of the recess 4, for the mounting of other tubular elements. These complementary holes could, for example, be in alignment each with a corresponding tapped hole or with a through-hole, with perpendicular axis, permit-ting individual gripping of the tubular element penetrating it.

The collar assembly, in particular for street fixtures, according to the invention, permits an aesthetic mounting of a set of tubular structures on support posts, both on a flat surface as on an uneven surface, whilst assuring visual continuity at the level of each assembly node formed by two collars on a post. This collar is particularly applicable to the mounting of barriers, but is also useful in the mounting of other equipment, in particular street fixtures, such as wastebaskets, cans, benches, etc. on the support posts.

The invention has been described more particularly with respect to support posts and barriers having cylindrical tubular uprights, but the use of the invention also extends to tubes of different sections, namely polygonal or oval, the adjustment of the angular position between two collars mounted on the same post being thus simply limited by the section of said post. The same is true as concerns the barrier uprights relative to the collar.

Of course, the invention is not limited to the embodiment described and shown in the accompanying drawings. Modifications remain possible, particularly as to the construction of the various elements or by substitution of technical equivalents, without thereby departing from the scope of protection of the invention.

What is claimed is:

1. Assembly collar, in particular for street fixtures, having a portion (1) for mounting on a support post, provided with a hole (2) of a diameter corresponding to that of said post and provided with a cutout (3) in a median longitudinal plane perpendicular to the axis of the hole (2) and permitting interfitting of a said collar into a corresponding cutout of a corresponding collar, the collar having a tubular recess (4) having an axis parallel to that of said hole (2) for securement on the support post, said collar being in two independent half portions interconnected in a service position by means of at least one screw or gripping bolt (5), wherein the two half portions constituting the collar are interconnected by means of a hinge (6) at the level of said portion (1) for securement on the support post, in a vertical longitudinal plane of the collar passing through the parallel axes of the hole (2) and the recess (4).

2. Collar according to claim 1, characterized in that the two half portions constituting the collar are in the form of independent elements applied against each other in said service position along a flat surface.

3. Collar according to claim 1, which is moreover provided, in an end carrying the recess (4), with a hole extending perpendicularly to said recess (4), and permitting a mounting at an end of a stub or other securement device of a tubular element, said hole being traversed perpendicularly by a screw or a bolt for gripping the collar.

* * * * *